United States Patent Office 2,827,480
Patented Mar. 18, 1958

2,827,480

PREPARATION OF PENTAERYTHRITOL TRICHLOROHYDRIN MONOACYLATES

Elwin A. Harris, Wilmington, and William M. Schilling, New Castle County, Del., assignors to Hercules Powder Company, Wilmington, Del., a corporation of Delaware No Drawing. Application June 21, 1954
Serial No. 438,363

8 Claims. (Cl. 260—488)

This invention relates to the preparation of pentaerythritol trichloromonoacylates directly from pentaerythritol by reacting the latter with acetic acid and hydrogen chloride in the presence of a catalyst. The prefix trichloro- is named trichlorohydrin in the claims.

Pentaerythritol trichloromonoacylates are important intermediates for the preparation of 3,3-bis(chloromethyl) oxetane which, in turn, may be polymerized to a high molecular weight polymer useful for the production of films, filaments, plastics, etc. Previously the pentaerythritol trichloromonoacylates have been prepared only by a two-step process, namely, by first esterifying pentaerythritol and then reacting the pentaerythritol tetraacylate with hydrogen chloride.

Now, in accordance with this invention, it has been found that pentaerythritol trichloromonoacylates may be prepared directly from pentaerythritol by reacting pentaerythritol with a mixture of hydrogen chloride and a carboxylic acid in the presence of a Friedel-Crafts type catalyst. Not only is there a great saving in carrying out the preparation of these compounds by a single reaction, but an even greater advantage is that the process may be carried out as a continuous operation.

The following examples will illustrate the preparation of pentaerythritol trichloromonoacylates in accordance with this invention by both batch and continuous processes.

Example 1

A pressure vessel was charged with 65 parts of glacial acetic acid, 10 parts of nitration grade pentaerythritol (at least 99% pure), and 0.5 part of zinc acetate. The solution so obtained was first saturated at room temperature with hydrogen chloride and then at 0° C., a total of 23 parts of hydrogen chloride being absorbed by the solution. The vessel was closed and heated to 180° C. for 17 hours. After cooling, the vessel was opened and the acetic acid was removed by distillation. The residue was dissolved in 135 parts of methylene chloride. This solution was then washed with water, and after drying with calcium chloride was distilled to remove the methylene chloride. The residue that remained amounted to 15 parts and had a refractive index at 20° C. of 1.4806. To determine the amount of pentaerythritol trichloromonoacetate in this product, it was converted to 3,3-bis(chloromethyl) oxetane by a standard process of ring closure with potassium hydroxide in isopropanol under conditions that convert pentaerythritol trichloromonoacetate to 3,3-bis-(chloromethyl) oxetane in 90% conversion. The overall conversion of pentaerythritol to 3,3-bis(chloromethyl)-oxetane was 69%, demonstrating that the conversion of pentaerythritol to pentaerythritol trichloromonoacetate was 77%.

Example 2

A pressure vessel was charged with 20 parts of resin grade pentaerythritol (about 90% pure), 65 parts of glacial acetic acid, and 0.5 part of zinc diacetate dihydrate. The mixture was cooled to 0° C. while hydrogen chloride was passed into the solution until 22 parts had been absorbed. The vessel was then sealed and heated at 200° C. for 4 hours. After cooling and opening, the acetic acid was removed by distillation. The residue amounted to 32.6 parts. On conversion to 3,3-bis(chloromethyl)-oxetane by treatment with potassium hydroxide in isopropanol, there was obtained 19.1 parts of a crude product containing 81.4% 3,3-bis(chloromethyl)oxetane. Thus the conversion of pentaerythritol to 3,3-bis(chloromethyl)-oxetane was 68%, demonstrating that the conversion of pentaerythritol to pentaerythritol trichloromonoacetate was about 75.5%.

Example 3

A pressure vessel was charged with 30 parts of a commercial pentaerythritol, 65 parts of acetic acid, 20 parts of water, 0.5 part of zinc acetate dihydrate, and 39.2 parts of hydrogen chloride. The vessel was sealed and heated for 4 hours at 200° C. After removing the acetic acid, there was obtained 39.6 parts of a product having a refractive index at 20° C. of 1.4847. Infrared analysis of this product showed that it contained 54% pentaerythritol trichloromonoacetate and 17% pentaerythritol trichlorohydrin.

Example 4

A pressure vessel was charged with 90 parts of a commercial pentaerythritol, 255 parts of acetic acid, 1.5 parts of zinc acetate dihydrate, and 93.6 parts of hydrogen chloride. The vessel was sealed and heated at 200° C. for 4 hours. Removal of the excess acetic acid left a residue of 143 parts having a refractive index at 20° C. of 1.4815. Infrared analysis and conversion to 3,3-bis-(chloromethyl)oxetane showed that the product contained about 85% or more of the pentaerythritol trichlorohydrin and/or acetate.

Example 5

To the top of a jacketed column, packed with ¼ inch Raschig rings and heated to 195–200° C., was fed a 36% solution of technical grade pentaerythritol in glacial acetic acid and containing 0.35% zinc chloride at the rate of 4.00 lb./hour. Hydrogen chloride was fed to the bottom of the column at 2.52 lb./hour, a rate sufficient to keep the operating pressure at 40 p. s. i. g. The overhead vapors were condensed and removed at the rate of 3.72 lb./hour and excess hydrogen chloride was bled from the system at the rate of 0.30 lb./hour. The colum was operated under flooded conditions, the liquid level being maintained at the top of the packing. The product which was removed continuously from the bottom of the reactor at the rate of 2.38 lb./hour contained 79% pentaerythritol trichloroacetate and 7.8% pentaerythritol trichlorohydrin, accounting for 85% of the pentaerythritol fed to the column.

Example 6

To the top of the column described in the foregoing example and heated to 190–200° C. was fed a 47% solution of technical grade pentaerythritol in glacial acetic acid and containing 0.94% of zinc chloride at the rate of 5.92 lb./hour. Hydrogen chloride was fed to the bottom of the column as 3.94 lb./hour, a rate sufficient to keep the operating pressure at 40 p. s. i. g. The overhead vapors were condensed and removed at the rate of 4.45 lb./hour and excess hydrogen chloride was bled from the system at the rate of 0.30 lb./hour, the column again being operated under flooded conditions. The product which was removed continuously from the bottom of the column at 5.20 lb./hour contained 77% pentaerythritol trichloroacetate and 6.5% pentaerythritol trichlorohydrin, accounting for 83% of the pentaerythritol fed to the column.

Example 7

To the top of the column described in Example 5 and heated to 220° C. was fed a 36% solution of technical grade pentaerythritol in glacial acetic acid and containing 0.7% of zinc chloride at the rate of 4.05 lb./hour. Hydrogen chloride was fed to the bottom of the column at the rate of 1.93 lb./hour, the column being maintained at a pressure of 40 p. s. i. g. The overhead vapors were condensed and removed at the rate of 3.47 lb./hour. The tower was operated under film-type conditions and the product was removed continuously at the rate of 2.48 lb./hour from the bottom of the tower. The product so obtained contained 74% pentaerythritol trichloroacetate and 8.3% pentaerythritol trichlorohydrin, accounting for 83% of the pentarythritol fed to the column.

The process of this invention makes it possible to produce any pentaerythritol trichloromonoacylate directly from pentaerythritol. While the foregoing examples have illustrated the process for the preparation of pentaerythritol trichloroacetate, any other mono ester of pentaerythritol trichlorohydrin may be prepared by substituting the appropriate acid for the acetic acid used in the examples. Thus pentaerythritol may be reacted in a single reaction with hydrogen chloride and any aliphatic, cycloaliphatic, or aromatic carboxylic acid and is particularly important for the reaction wherein the acid is a lower fatty acid, as, for example, propionic, butyric, valeric, caproic, etc., acids, in accordance with this invention to produce pentaerythritol trichloromonoacylates.

As already pointed out and exemplified in the examples, the reaction of pentaerythritol with hydrogen chloride and the carboxylic acid is carried out in the presence of a catalyst. Catalysts which are effective as promoters for this reaction are metal salts of the Friedel-Crafts type, as, for example, the salts of such metals as zinc, aluminum, iron, mercuric salts, stannic salts, etc. Any of the common salts of these metals may be used, as, for example, the inorganic salts such as the chloride, sulfate, carbonate, etc., or the salts of organic acids, as, for example, the formate, acetate, propionate, etc. Obviously a material such as zinc oxide may be used as the source of the zinc ions since it will form zinc chloride under the conditions of the reaction. These salts act as true catalysts for the process and consequently any amount of the catalytic agent may be used from a catalytic amount up to about 10%. In general, an amount of from about 0.05% to about 5% of the catalyst is used, based on the weight of pentaerythritol.

The process in accordance with this invention may be carried out under a wide variety of conditions. The ratio of carboxylic acid to pentraerythritol and of hydrogen chloride to pentaerythritol may be varied widely. Obviously, for optimum yields of the trichloromonoacylate at least the theoretical quantity should be used and generally an excess is used. However, for some purposes the pentaerythritol trichlorohydrin may be useful, in which case the remaining hydroxy of the pentaerythritol molecule need not be esterified by the carboxylic acid. In this case a mole to mole ratio of carboxylic acid to pentaerythritol need not be used. In general, the molar ratio of the carboxylic acid to pentaerythritol may be varied from about 0.1:1 to 30:1, and preferably will be within the range of from about 1:1 to about 6:1. The molar ratio of hydrogen chloride to pentaerythritol likewise may be varied widely but generally will be within the range of from about 3:1 to about 50:1, and preferably from about 3:1 to about 15:1. As demonstrated by the foregoing examples, the hydrogen chloride does not need to be anhydrous, but generally anhydrous hydrogen chloride will be used for carrying out the process as a continuous operation.

As already mentioned, the process may be carried out as a batch or continuous process. Any of the usual techniques for carrying out such operations may be used, as, for example, the continuous process may be carried out in a column or tower operated under either film or flooded conditions. In the batch process a convenient method is to simply dissolve or mix the pentaerythritol with the carboxylic acid, add the catalyst, absorb the desired amount of hydrogen chloride into the mixture, and then seal and heat the vessel to the desired reaction temperature. Or the hydrogen chloride may be passed into the mixture of pentaerythritol, acetic acid, and catalyst at the reaction temperature. In the continuous process a solution of pentaerythritol in the carboxylic acid is conveniently fed to the top of a tower at elevated temperature and the hydrogen chloride is then fed to the bottom of the tower. The water, unreacted carboxylic acid, and unreacted hydrogen chloride may be removed overhead and the product removed from the bottom of the tower.

The temperature at which the reaction is carried out will depend upon the type of process being used, the pressure, etc. In general, a temperature within the range of from about 120° C. to about 350° C. may be used and preferably a temperature of from about 160° C. to about 250° C. may be used. In carrying out the process as a batch reaction, the reaction rate is considerably reduced at the lower temperatures but is essentially complete in a relatively short time at temperatures within the range of 180° C. to 220° C. In carrying out the process as a continuous operation, the optimum temperature appears to lie within the range of from about 180° C. to about 220° C.

The process in accordance with this invention may be carried out at any pressure. When the reaction is carried out as a continuous operation, it is generally done under a slight pressure of hydrogen chloride, as, for example, up to about 40 p. s. i. g. Obviously higher pressures may be used and when the process is operated on a batch basis, and particularly when carried out in a sealed vessel, higher pressures may be used.

The pentaerythritol trichloroacylate is generally obtained in admixture with small amounts of pentaerythritol trichlorohydrin, pentaerythritol dichlorodiacylate, etc., along with the unreacted constituents. The unreacted acid and hydrogen chloride along with the water are readily separated from the crude product mixture by distillation. The individual components of the crude product may be separated and isolated, if desired, by fractional distillation. For the preparation of 3,3-bis(chloromethyl)-oxetane the crude reaction product remaining as a residue after the distillation of the water and unreacted material may be used directly without any further purification.

What we claim and desire to protect by Letters Patent is:

1. The process of preparing a pentaerythritol trichlorohydrinmonoacylate which comprises reacting pentaerythritol with a mixture of hydrogen chloride and a lower fatty acid in the presence of a metal salt catalyst of the Friedel-Crafts catalyst type at a temperature of from about 120° C. to about 350° C., said catalyst being present in an amount up to about 10% based on the weight of the pentaerythritol.

2. The process of preparing pentaerythritol trichlorohydrinacetate which comprises reacting pentaerythritol with a mixture of hydrogen chloride and acetic acid in the presence of a zinc salt catalyst at a temperature of from about 160° C. to about 250° C., said catalyst being present in an amount of from about 0.05% to about 5.0% based on the weight of the pentacrythritol.

3. The process of preparing pentaerythritol trichlorohydrinacetate which comprises reacting pentaerythritol with a mixture of hydrogen chloride and acetic acid in the presence of zinc chloride catalyst at a temperature of from about 160° C. to about 250° C., said catalyst being present in an amount of from about 0.05% to about 5.0% based on the weight of the pentaerythritol.

4. The process of preparing pentaerythritol trichlorohydrinacetate which comprises reacting pentaerythritol with a mixture of hydrogen chloride and acetic acid in the presence of zinc acetate catalyst at a temperature of from about 160° C. to about 250° C., said catalyst being present in an amount of from about 0.05% to about 5.0% based on the weight of the pentaerythritol.

5. The process of preparing a pentaerythritol trichlorohydrinmonoacylate which comprises passing hydrogen chloride continuously into a solution of pentaerythritol in a lower fatty acid at a temperature of from about 160° C. to about 250° C. and in contact with a metal salt catalyst of the Friedel-Crafts catalyst type while continuously withdrawing the pentaerythritol trichlorohydrinmonoacylate from the reaction zone at a point removed from the hydrogen chloride inlet point, said catalyst being present in an amount of from about 0.05% to about 5.0% based on the weight of the pentaerythritol.

6. The process of preparing pentaerythritol trichlorohydrinacetate which comprises passing hydrogen chloride continuously into a solution of pentaerythritol in acetic acid at a temperature of from about 160° C. to about 250° C. and in contact with a zinc salt catalyst while continuously withdrawing the pentaerythritol trichlorohydrinacetate from the reaction zone at a point removed from the hydrogen chloride inlet point, said catalyst being present in an amount of from about 0.05% to about 5.0% based on the weight of the pentaerythritol.

7. The process of preparing pentaerythritol trichlorohydrinacetate which comprises continuously passing hydrogen chloride countercurrently through a solution of pentaerythritol in acetic acid in contact with a zinc salt catalyst and at a temperature of from about 160° C. to about 250° C. and continuously withdrawing the product from the reaction zone, said catalyst being present in an amount of from about 0.05% to about 5.0% based on the weight of the pentaerythritol.

8. The process of preparing pentaerythritol trichlorohydrinacetate which comprises continuously passing hydrogen chloride countercurrently through a solution of pentaerythritol in acetic acid in contact with zinc chloride catalyst and at a temperature of from about 180° C. to about 220° C. and continuously withdrawing the product from the reaction zone, said catalyst being present in an amount of from about 0.05% to about 5.0% based on the weight of the pentaerythritol.

References Cited in the file of this patent

UNITED STATES PATENTS 2,763,679    Dee                   Sept. 18, 1956

OTHER REFERENCES

Fecht: Ber. Deut. Chem., 40 (1907), 3888–9.
Dobryanskii et al.: Chem. Abst., 42 (1948), 1562.